UNITED STATES PATENT OFFICE.

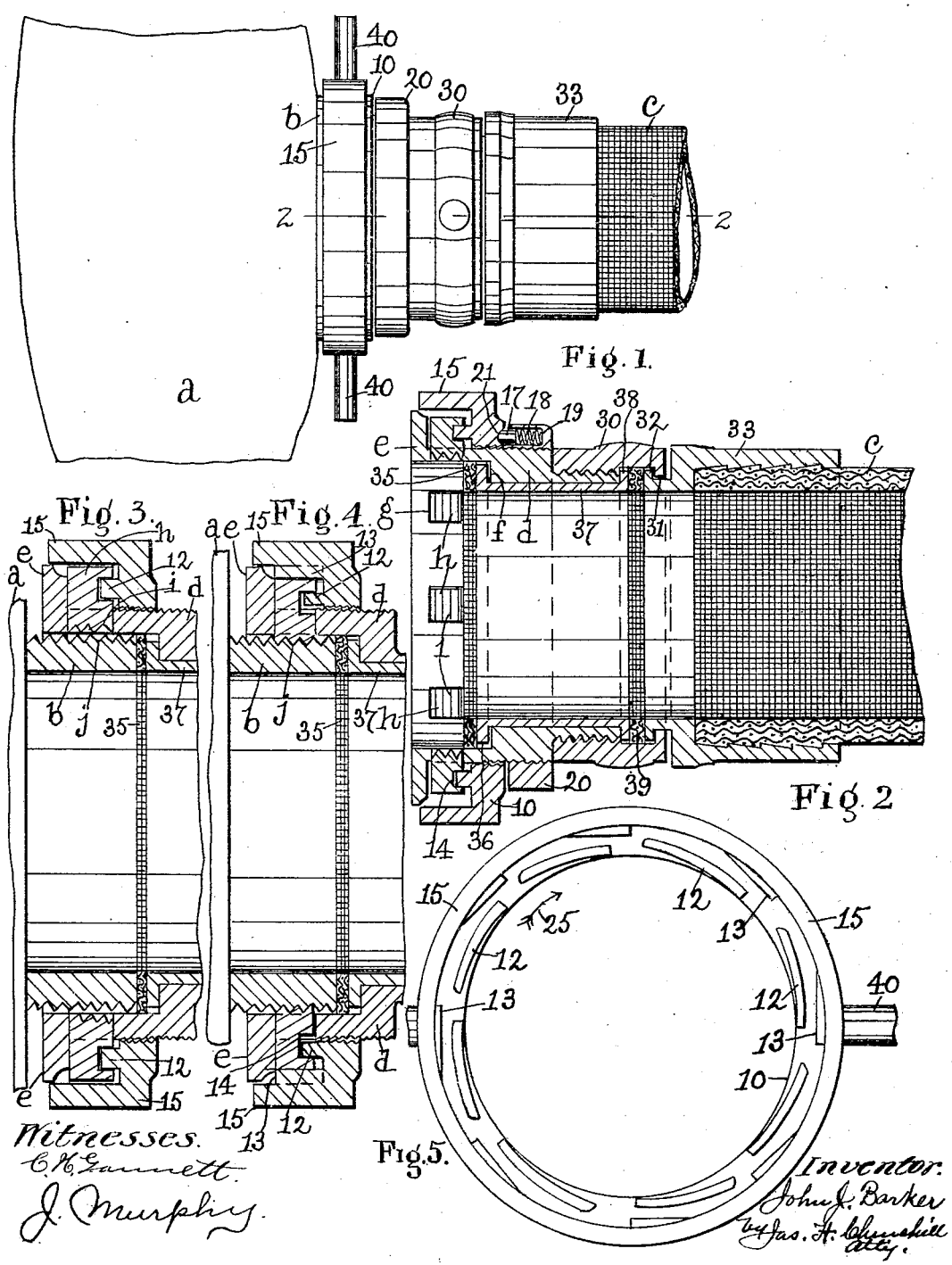

JOHN J. BARKER, OF ARLINGTON, MASSACHUSETTS, ASSIGNOR TO BOSTON COUPLING COMPANY, OF BOSTON, MASSACHUSETTS, A FIRM.

COUPLING DEVICE.

961,283.   Specification of Letters Patent.   Patented June 14, 1910.

Application filed January 4, 1909. Serial No. 470,560.

*To all whom it may concern:*

Be it known that I, JOHN J. BARKER, a citizen of the United States, residing in Arlington, county of Middlesex, and State of Massachusetts, have invented an Improvement in Coupling Devices, of which the following description, in connection with the accompanying drawings, is a specification, like characters on the drawings representing like parts.

This invention relates to a coupling device especially adapted among other uses, to be employed as a means for quickly attaching and detaching a fire hose with and from a hydrant, whereby the hose can be connected with and disconnected from the hydrant substantially in an instant. For this purpose, I employ a coupling member, which is attached to the hose, and provide said member with preferably a plurality of locking devices, which are provided on their inner surfaces with teeth or serrations to engage external screw-threads on the coöperating coupling member attached to the hydrant, and provide means for positively moving said locking devices into and out of their operative positions as will be described. These and other features of this invention will be pointed out in the claims at the end of this specification.

Figure 1 is an elevation of a portion of a hydrant and a hose attached thereto by a coupling device embodying this invention. Fig. 2, a longitudinal section on an enlarged scale taken on the line 2—2, Fig. 1 of the coupling member and a portion of the hose shown therein. Figs. 3 and 4, details in section showing the coupling device in its inoperative and operative positions, and Fig. 5, a detail to be referred to.

Referring to the drawings, $a$ represents a hydrant of any suitable or usual construction having the externally threaded nipple $b$ forming the male member of the coupling device. The nipple $b$ has coöperating with it a female member embodying this invention and to which the usual hose $c$ is connected. The female member herein shown comprises a sleeve $d$ of an internal diameter substantially equal to the internal diameter of the hose $c$ and nipple $b$, and provided with an enlarged end portion $e$ having an internal diameter greater than the external diameter of the nipple or male coupling member $b$, which forms with the portion of smaller diameter an annular shoulder $f$, and which enables the enlarged portion $e$ to be slipped over the nipple $b$. The enlarged portion $e$ of the female member is provided with a plurality of holes $g$ distributed about its circumference and extended through the same, and in which are located locking devices $h$. The holes $g$ and the locking devices $h$ may be made circular in cross-section, but I prefer to make them angular in cross-section and preferably square.

The locking devices $h$ are provided on their inner faces with teeth or serrations $i$ of suitable size and shape to engage the screw-threads $j$ on the nipple $b$, and provision is made for bodily moving the locking devices into and out of engagement with the screw-threads $j$ of the nipple $b$. For this purpose, I employ a cam ring 10 mounted on the sleeve or female member $d$ and provided with two sets of cams 12, 13 (see Fig. 5), which coöperate with the locking devices $h$. The cams 12 are located on the underside of the ring 10 and enter slots 14 in the locking devices, so as to be positively engaged therewith, and the cams 13 are located on the inner circumference of an annular flange 15 on said ring and are substantially opposite the cams 12 so as to engage the outer ends of the locking devices and force the latter into their locked or engaged position, and firmly support or back up the locking devices and holding them firmly in engagement with the nipple $b$ until positively released as will be described. The cam ring 10 may be made of larger diameter than the female member $d$ and may be connected by a bolt 17 actuated by a spring 18 in a socket 19 in a ring 20, which is in threaded engagement with the female member $d$. The spring-actuated bolt 17 enters one of two depressions 21 in the cam ring and serves to lock the cam ring to the ring 20 in both the engaged and disengaged positions of the locking dogs or devices. In the construction herein shown, the cams 12 are at all times in engagement with the locking devices $h$, and a slight rotation of the cam ring in the direction of the arrow 25, Fig. 5, serves to bodily move the locking devices outward, so that their inner ends are substantially flush with the inner surface of the coupling member $d$ as represented in Figs. 2 and 3. This position of the locking devices may be considered the normal position of the same, and when the locking devices are thus located, it will be observed that the female member can be slipped over the male member or nipple $b$ and by a slight rotary movement of the cam ring in the direction opposite to that indicated by the arrow 25, the locking devices are bodily moved inwardly by the cams 13 assisted it may be by the cams 12, and are caused to engage with the screw-threads of the male member as represented in Fig. 4, thereby positively locking the coupling member $d$ to the nipple or member $b$. When it is desired to detach the coupling member $d$ from the member $b$, a slight rotary movement of the cam ring in the direction indicated by the arrow 25, bodily moves the locking devices out of engagement with the nipple $b$, and into substantially the position shown in Fig. 3, with the result that the coupling device may be slipped off of the nipple $b$ substantially in an instant. It will thus be observed, that the hose $c$ can be connected with and disconnected from the hydrant substantially in an instant, which is of great importance in case of fires, as it frequently happens that it is desired to change the hose from one hydrant to another, and by means of the coupling device herein shown, this change can be made in the least possible time by hand and without the use of a wrench or other tool.

The coupling device or member $d$ may be attached to the hose $c$ in any suitable manner, and in the present instance, this attachment is effected by means of the internally threaded ring 30, which engages external screw-threads on the member $d$ and is provided with a lip or flange 31, which engages a lip or flange 32 on a sleeve 33 firmly attached to the hose $c$ in any suitable or usual manner.

A water-tight joint between the parts is obtained by means of a rubber washer 35 interposed between the nipple $b$ and a flange 36 on one end of a sleeve 37 loosely fitted in the female member and capable of longitudinal movement therein, and provided at its opposite end with a flange 38 between which and the flange 32 on the sleeve 33, is interposed a rubber washer 39.

The cam ring 10 may be provided with projections 40, which serve as handles by which to turn said ring.

By providing the two sets of cams 12, 13, the slots 14 are not required to be made to fit the cam 12 accurately, as these cams are not depended upon to hold the locking devices firmly in engagement with the nipple, and as a result the slots 14 may be made sufficiently large to permit the locking devices to have a limited vertical and horizontal movement, which enables the threads of the locking devices to adapt themselves to the threads on the male member and compensate for any slight irregularity in the threads on the male member or for a jam or bruise of said threads. Furthermore, by the employment of a plurality of the sets of cams, the locking devices may be made as a stock piece with the slots 14 the same distance from the threaded end, thereby materially cheapening the cost of the device and enabling the engagement and disengagement to be effected substantially in an instant and with a minimum rotation of the cam ring.

Claims.

1. In a coupling device, in combination, a coupling member provided with external screw-threads, a coöperating coupling member capable of being slipped over the first-mentioned member and provided with a plurality of openings extended through it, locking devices carried by said coöperating coupling member and provided with slots and located in said openings and bodily movable therein, a cam ring rotatably mounted on said coöperating coupling member and having a plurality of sets of cams, one set being extended into said slots to effect bodily movement of the locking devices out of engagement with the external screw-threads of the first-mentioned coupling member by rotary movement of said cam ring, and the other set of cams coöperating with said locking devices to effect their inward movement and to maintain them in engagement with said screw-threads, substantially as described.

2. In a coupling device, in combination, a female coupling member comprising a sleeve having an enlarged end portion forming a shoulder with the main portion of said sleeve and into which the coöperating male member is inserted, said enlarged portion having a plurality of openings extended through it, locking devices located in said openings and bodily movable therein and provided with slots, a cam ring rotatably mounted on said coupling member and having two sets of cams, one set being in engagement with the slots of said locking devices to effect bodily movement thereof in one direction by rotary movement of said ring, and the other set coöperating with the outer ends of said locking devices to effect bodily movement thereof in the opposite direction, substantially as described.

3. In a coupling device, in combination, a female coupling member comprising a sleeve having an enlarged end portion forming a shoulder with the main portion of said sleeve and into which the coöperating male member is inserted, said enlarged portion provided with a plurality of openings extended radially through it, locking devices located in said openings and bodily movable therein and provided with slots, and a cam ring provided with a flange and rotatably mounted on said coupling member and having a plurality of cams on the under side of said ring to enter the slots in said locking devices to effect bodily movement of the same in one direction by rotary movement of said ring and having a plurality of cams on the inner surface of said flange to engage the outer ends of said locking devices and move them in the opposite direction, substantially as described.

4. In a coupling device, in combination, a female coupling member comprising a sleeve having an enlarged end portion forming a shoulder with the main portion of said sleeve and into which the coöperating male member is inserted, said enlarged portion having a plurality of openings extended through it, locking devices located in said openings and bodily movable therein and provided with slots, a cam ring rotatably mounted on said coupling member and having two sets of cams, one set being in engagement with the slots of said locking devices to effect bodily movement thereof in one direction by rotary movement of said ring, and the other set coöperating with the outer ends of said locking devices to effect bodily movement thereof in the opposite direction, a ring in threaded engagement with the exterior of said sleeve, and a spring-actuated bolt to detachably connect said cam ring to said ring, substantially as described.

In testimony whereof, I have signed my name to this specification in the presence of two subscribing witnesses.

JOHN J. BARKER.

Witnesses:
 JAS. H. CHURCHILL,
 J. MURPHY.